US012307950B2

(12) United States Patent
Shin et al.

(10) Patent No.: US 12,307,950 B2
(45) Date of Patent: May 20, 2025

(54) DISPLAY DEVICE AND METHOD FOR CONTROLLING SAME

(71) Applicant: SAMSUNG ELECTRONICS CO., LTD., Suwon-si (KR)

(72) Inventors: Seungyong Shin, Suwon-si (KR); Jungmo Kang, Suwon-si (KR); Changhoon Kim, Suwon-si (KR); Yongmin Jung, Suwon-si (KR); Jonghoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/395,105

(22) Filed: Dec. 22, 2023

(65) Prior Publication Data

US 2024/0127745 A1 Apr. 18, 2024

Related U.S. Application Data

(63) Continuation of application No. PCT/KR2022/009327, filed on Jun. 29, 2022.

(30) Foreign Application Priority Data

Jul. 22, 2021 (KR) ........................ 10-2021-0096677

(51) Int. Cl.
*G09G 3/32* (2016.01)

(52) U.S. Cl.
CPC ........... *G09G 3/32* (2013.01); *G09G 2310/04* (2013.01); *G09G 2310/08* (2013.01);
(Continued)

(58) Field of Classification Search
CPC ........... G09G 2310/04; G09G 2310/08; G09G 2320/0633; G09G 2330/021;
(Continued)

(56) References Cited

U.S. PATENT DOCUMENTS 7,436,384 B2 10/2008 An
8,482,493 B2 7/2013 Yamazaki et al.
(Continued)

FOREIGN PATENT DOCUMENTS

CN 203748048 U * 7/2014
DE 112018006709 T5 * 9/2020 ........... B60Q 1/1415
(Continued)

OTHER PUBLICATIONS

International Search Report (PCT/ISA/210) issued Oct. 26, 2022 by the International Searching Authority in International Patent Application No. PCT/KR022/009327.
(Continued)

*Primary Examiner* — Ricardo Osorio
(74) *Attorney, Agent, or Firm* — Sughrue Mion, PLLC

(57) ABSTRACT

A display device includes: Light Emitting Diode (LED) blocks connected in series; a driver Integrated Circuit which supplies a current to the LED blocks and is connected in series to one of the LED blocks; switching elements connected in parallel to the LED blocks; and a controller for controlling on/off of the switching elements to adjust which LED block to supply the current, over a time for implementing a unit frame.

15 Claims, 17 Drawing Sheets

(52) U.S. Cl.
CPC ............... *G09G 2320/0633* (2013.01); *G09G 2330/021* (2013.01); *G09G 2370/16* (2013.01)

(58) Field of Classification Search
CPC ................. G09G 2370/16; G09G 3/32; G09G 2320/0626; G09G 5/006; H05B 47/16; H05B 47/165; H05B 45/48; H05B 45/10; H05B 45/325; H05B 45/33; H05B 45/44
See application file for complete search history.

(56) References Cited

U.S. PATENT DOCUMENTS

| | | | | |
|---|---|---|---|---|
| 9,060,405 | B2 | 6/2015 | Kim et al. | |
| 9,084,321 | B2 | 7/2015 | Cao | |
| 9,236,705 | B2 | 1/2016 | Deppe | |
| 9,237,627 | B2 * | 1/2016 | Takata | H05B 45/46 |
| 9,445,470 | B2 * | 9/2016 | Wang | H05B 45/48 |
| 9,826,589 | B1 * | 11/2017 | Gao | H05B 45/46 |
| 9,848,471 | B2 | 12/2017 | Jang et al. | |
| 10,154,556 | B2 * | 12/2018 | Lee | H05B 45/46 |
| 10,342,085 | B2 | 7/2019 | Joo et al. | |
| 10,971,057 | B2 | 4/2021 | Jung et al. | |
| 11,219,109 | B2 | 1/2022 | Fukatsu et al. | |
| 11,553,569 | B2 | 1/2023 | Kim et al. | |
| 2009/0073109 | A1 | 3/2009 | Shin et al. | |
| 2011/0080432 | A1 | 4/2011 | Nakazawa et al. | |
| 2012/0223649 | A1 | 9/2012 | Saes et al. | |
| 2013/0307423 | A1 | 11/2013 | Lee | |
| 2015/0382415 | A1 * | 12/2015 | Wang | H05B 45/48 315/210 |
| 2018/0070415 | A1 * | 3/2018 | Joo | H05B 45/46 |
| 2022/0206567 | A1 | 6/2022 | Zou et al. | |

FOREIGN PATENT DOCUMENTS

| | | | | |
|---|---|---|---|---|
| JP | 4754897 | B2 | 8/2011 | |
| JP | 2011-204437 | A | 10/2011 | |
| JP | 4969686 | B2 | 7/2012 | |
| JP | 5820062 | B2 | 11/2015 | |
| JP | 6240762 | B2 | 11/2017 | |
| JP | 2019-117752 | A | 7/2019 | |
| JP | 2022-21747 | A | 2/2022 | |
| KR | 10-2003-0054902 | A | 7/2003 | |
| KR | 1110380 | B1 * | 2/2012 | H05B 33/0824 |
| KR | 10-2012-0067918 | A | 6/2012 | |
| KR | 10-2013-0105212 | A | 9/2013 | |
| KR | 10-2014-0070289 | A | 6/2014 | |
| KR | 10-2014-0139190 | A | 12/2014 | |
| KR | 10-2015-0076831 | A | 7/2015 | |
| KR | 10-1537990 | B1 | 7/2015 | |
| KR | 10-2016-0106973 | A | 9/2016 | |
| KR | 10-1653783 | B1 | 9/2016 | |
| KR | 10-2016-0126214 | A | 11/2016 | |
| KR | 10-2017-0059541 | A | 5/2017 | |
| KR | 10-2018-0065108 | A | 6/2018 | |
| KR | 10-2022-0026759 | A | 3/2022 | |
| KR | 10-2022-0098339 | A | 7/2022 | |
| WO | WO-2010143338 | A1 * | 12/2010 | G09G 3/3406 |
| WO | WO-2016036090 | A1 * | 3/2016 | H05B 33/0815 |

OTHER PUBLICATIONS

Written Opinion (PCT/ISA/237) issued Oct. 26, 2022 by the International Searching Authority in International Patent Application No. PCT/KR022/009327.
Communication issued Aug. 12, 2024 by the European Patent Office for European Patent Application No. 22846075.4.
Office Action dated Dec. 16, 2024, issued by Korean Patent Office In Korean Patent Application No. 10-2021-0096677.

* cited by examiner

DISPLAY DEVICE AND METHOD FOR CONTROLLING SAME

CROSS-REFERENCE TO RELATED APPLICATION(S)

This application is a by-pass continuation application of International Application No. PCT/KR2022/009327, filed on Jun. 29, 2022, which is based on and claims priority to Korean patent Application no. 10-2021-0096677, filed on Jul. 22, 2021, in the Korean Intellectual Property Office, the disclosures of which are incorporated by reference herein in their entireties.

BACKGROUND

1. Field

The disclosure relates to a display device, and more particularly, to a display device including light emitting diodes.

2. Description of Related Art

In general, display devices are a type of output devices for visually displaying obtained or stored image information to a user, and are used in various fields such as home or workplace.

Display devices may include, for example, a monitor device connected to a personal computer or a server computer, a portable computer device, a navigation terminal device, a general television device, Internet Protocol Television (IPTV), portable terminal devices such as a smartphone, tablet Personal Computer (PC), a Personal Digital Assistant (PDA) or a cellular phone, various display devices used to reproduce images such as advertisements or movies in an industrial field, or various kinds of audio/video systems.

Display devices may display an image using various types of display panels. For example, display devices may include a cathode ray tube panel, a Light Emitting Diode (LED) panel, an Organic LED (OLED) panel, a Liquid Crystal Display (LCD) panel, and the like.

Recently, the use of LED as a light source in a display device has been increasing. LED may be used in a backlight unit of an LCD device or as individual pixels in an LED panel.

In order to improve the performance of a high resolution display, an increase in the number of driver Integrated Circuits (ICs) that drive an LED is required, and the increase in the number of driver ICs causes an increase in the manufacturing cost and circuit complexity of the display device.

SUMMARY

Provided is a display device that may control a Light Emitting Diode (LED) in a time division manner to implement a high resolution while minimizing an increase in the number of driver Integrated Circuits (ICs) required to drive the LED, and a method for controlling the same.

According to one or more embodiments, a display device includes: a plurality of Light Emitting Diode (LED) blocks (groups) configured to be connected in series; a driver Integrated Circuit (IC) configured to supply a current to the plurality of LED blocks, and be connected in series to a first LED block of the plurality of LED blocks; a plurality of switching elements configured to be connected in parallel to the plurality of LED blocks; and a controller configured to control on/off of the plurality of switching elements to adjust which one of the plurality of LED blocks to supply the current, over a time for implementing a unit frame.

The controller may be further configured to divide the time for implementing the unit frame into a plurality of time periods, control on/off of the plurality of switching elements to supply the current to a portion of the plurality of LED blocks in a first portion of the plurality of time periods, and control on/off of the plurality of switching elements to supply the current to all of the plurality of LED blocks in a second portion of the plurality of time periods.

The display device may further include a power supply configured to be connected in series to a second LED block of the plurality of LED blocks to supply a drive voltage (VDD), wherein the controller may be further configured to control the power supply to adjust the drive voltage supplied to the plurality of LED blocks over the time for implementing the unit frame.

The controller may be further configured to control the power supply to increase or decrease the drive voltage supplied to the LED block in response to an increase or a decrease in a number of LED blocks of the plurality of LED blocks to which the current is supplied according to on/off status of a switching element.

The controller may be further configured to control the power supply to increase the drive voltage in response to the increase in the number of LED blocks to which the current is supplied, and control the power supply to decrease the drive voltage in response to the decrease in the number of LED blocks to which the current is supplied.

The plurality of LED blocks may include a third LED block; and a fourth LED block configured to be connected in series to the third LED block, wherein the plurality of switching elements may include a first switching element configured to be connected in parallel to the third LED block; and a second switching element configured to be connected in parallel to the fourth LED block.

The time for implementing the unit frame may include a first time period, a second time period, and a third time period, the first time period may indicate a time period corresponding to a first half of the time for implementing the unit frame, the second time period may indicate a time period corresponding to a first half of a remaining half of the time for implementing the unit frame, and the third time period may indicate a time period corresponding to a last quarter of the time for implementing the unit frame, and the controller may be further configured to control both the first switching element and the second switching element to be turned off for the first time period.

The controller may be further configured to control the first switching element to be turned off and control the second switching element to be turned on for the second time period, and control the first switching element to be turned on and control the second switching element to be turned off for the third time period.

The controller may be further configured to control the power supply to supply a voltage equivalent to twice a drive voltage required for operation of a single LED block for the first time period, and supply a drive voltage required for operation of a single LED block for the second time period and the third time period.

The controller may be further configured to control the driver IC to output the current according to data to be emitted from the LED block.

The controller may be further configured to control the plurality of LED blocks to represent a luminance using one of a Pulse Width Modulation (PWM) control or a Pulse Amplitude Modulation (PAM) control.

According to one or more embodiments, a method for controlling a display device including a plurality of Light Emitting Diode (LED) blocks connected in series, a driver Integrated Circuit (IC) to supply a current to the plurality of LED blocks and be connected in series to one LED block of the plurality of LED blocks, and a plurality of switching elements configured to be connected in parallel to each of the plurality of LED blocks, the method including: determining an LED block of the plurality of LED blocks to which the current is supplied, over a time for implementing a unit frame; and controlling on/off of the plurality of switching elements to supply the current to the determined LED block.

The controlling of on/off of the plurality of switching elements may further include dividing the time for implementing the unit frame into a plurality of time periods, controlling on/off of the plurality of switching elements to supply the current to a portion of the plurality of LED blocks in a first portion of the plurality of time periods, and controlling on/off of the plurality of switching elements to supply the current to all of the plurality of LED blocks in a second portion of the plurality of time periods.

The method may further include adjusting a drive voltage supplied to the plurality of LED blocks over the time for implementing the unit frame.

The adjusting of the drive voltage may include increasing or decreasing the drive voltage supplied to the LED block in response to an increase or a decrease in a number of LED blocks of the plurality of LED blocks to which the current is supplied according to on/off status of a switching element.

According to one or more embodiments, a circuit may be simplified and cost may be reduced by reducing the number of required driver Integrated Circuits (ICs) while implementing a high resolution.

In addition, according to one or more embodiments, power consumption and heat generation may be reduced by adjusting power supplied from a power supply in response to the number of LED blocks that are driven.

BRIEF DESCRIPTION OF DRAWINGS

The above and other aspects, features, and advantages of certain embodiments of the present disclosure are more apparent from the following description taken in conjunction with the accompanying drawings, wherein.

DETAILED DESCRIPTION

Figure 1:
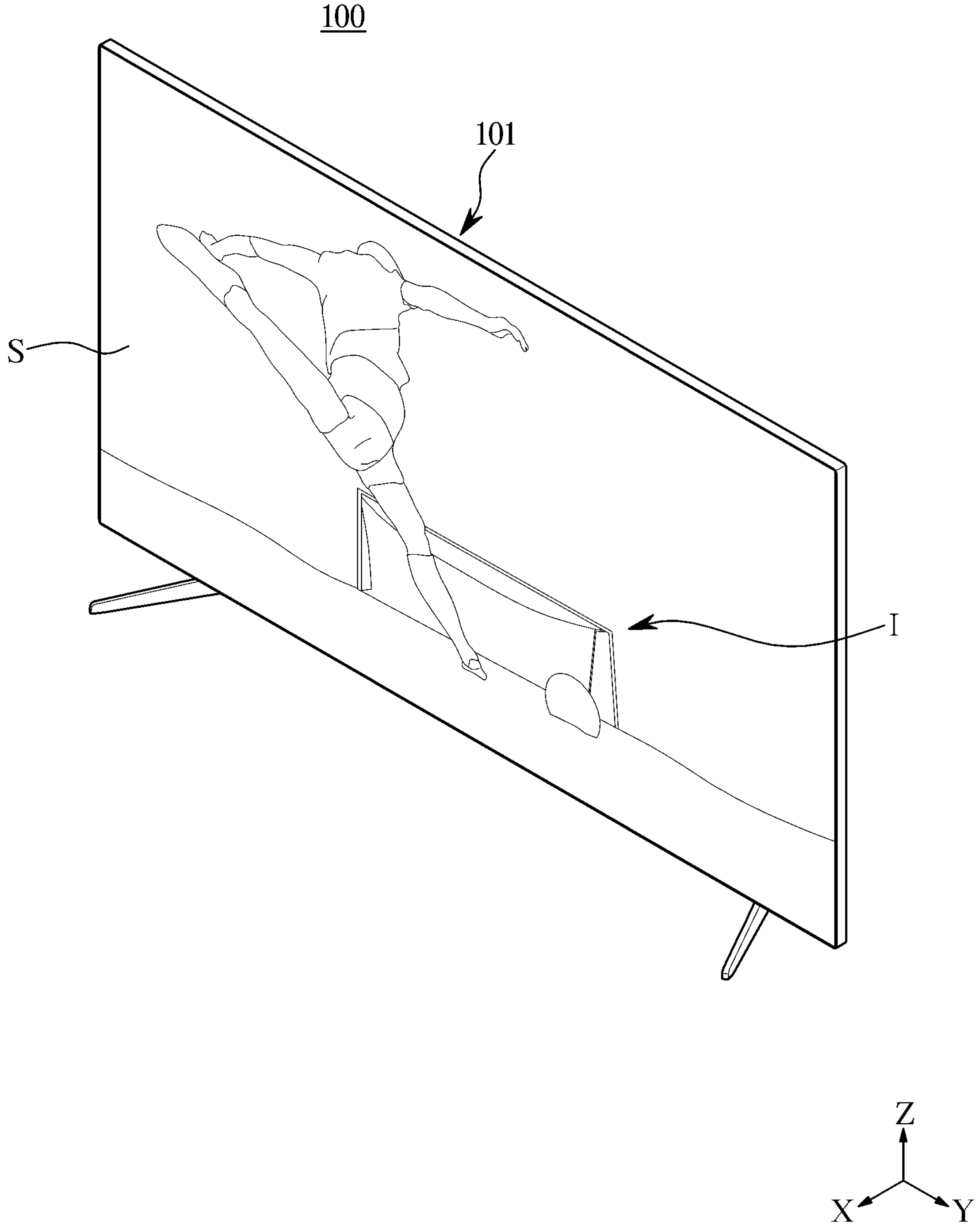
FIG. 1 illustrates an exterior of a display device according to one or more embodiments.

Like reference numerals throughout the specification denote like elements. Also, no description is made of well-known functions and configurations in the drawings and relevant descriptions. The terms such as "part", "module", "member", "block" and the like may refer to at least one process processed by at least one hardware or software. According to embodiments, a plurality of "parts", "modules", "members", "blocks" may be embodied as a single element, or a single of a "part", "module", "member" and "block" may include a plurality of elements.

It will be understood that when an element is referred to as being "connected" to another element, it may be directly or indirectly connected to the other element, wherein the indirect connection includes "connection" via a wireless communication network.

It will be understood that the term "include" when used in this specification does not preclude the presence or addition of other components, unless the context clearly dictates otherwise.

It will be understood that when it is stated in this specification that a member is located "on" another member, not only a member may be in contact with another member, but also still another member may be present between the two members.

It will be understood that, although the terms "first", "second", "third", and "fourth" may be used herein to describe various elements, these elements should not be limited by these terms, and the terms are only used to distinguish one element from another.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, a display device and a method for controlling the display device according to one or more embodiments will be described in detail with reference to the accompanying drawings.

Figure 2:
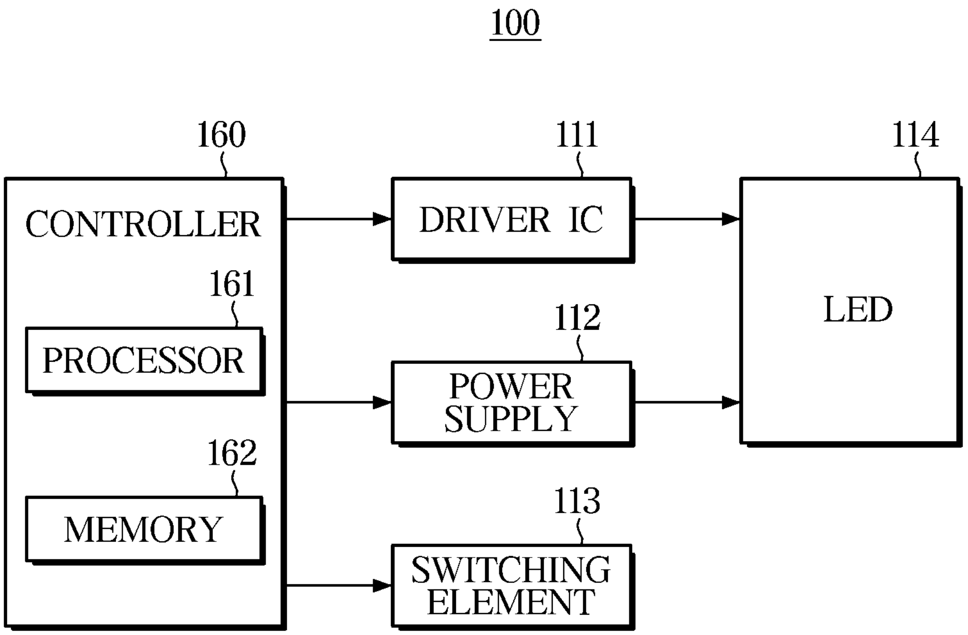
FIG. 2 is a control block diagram illustrating a display device according to one or more embodiments.

FIG. 1 is a diagram of an exterior of a display device according to one or more embodiments. FIG. 2 is an exploded perspective view of partial configuration of a display device according to one or more embodiments.

A display device 100 is a device capable of processing an image signal received from the outside and visually displaying a processed image. Hereinafter, a case in which the display device 100 is a television (TV) is exemplified, but is not limited thereto. For example, the display device 100 may be implemented in various forms, such as a monitor, a portable multimedia device, a portable communication device, a portable computing device, and the like, and the form of the display device 100 is not limited as long as it is a device that visually displays an image.

In addition, the display device 100 may be a Large Format Display (LFD) installed outdoors, such as on a roof of a building or at a bus stop, or wherever a large number of people may enter and exit, even indoors such as at subway stations, shopping malls, movie theaters, office buildings, and stores.

The display device 100 may receive a video signal and an audio signal from various content sources, and output video and audio corresponding to the video signal and the audio signal, respectively. For example, the display device 100 may receive television broadcast content through a broadcast reception antenna or a wired cable, receive content from a content playback apparatus, or receive content from a content-providing server of a content provider.

The display device 100 may include a self-luminous display panel displaying an image using an element emitting light by itself. The self-luminous display panel may include a Light Emitting Diode (LED) panel. The self-luminous display panel may also include a non-self-luminous display panel that transmits or blocks light emitted from a backlight unit to display an image. The non-self-luminous display panel may include a Liquid Crystal Display (LCD) panel, and the like.

As shown in FIG. 1, the display device 100 may include a body 101 including a plurality of components for displaying an image, and a screen S provided on one side of the body 101 to display an image I.

The body 101 forms an exterior of the display device 100, and components of the display device 100 for displaying the image I may be provided inside the body 101. It is illustrated in FIG. 1 that the body 101 has a flat plate shape, but the shape of the body 101 is not limited to that shown in FIG. 1. For example, the body 101 may have a curved shape such that both left and right ends protrude forward and a center is concave.

The screen S is formed on a front surface of the body 101, and the image I, which is visual information, may be displayed on the screen S. For example, the screen S may display a still image or a video, as well as a two-dimensional (2D) plane image or a three-dimensional (3D) stereoscopic image.

The display device 100 may be implemented as a stand type, as shown in FIG. 1, or may be implemented as a wall-mounted type. In addition, as shown in FIG. 1, the display device 100 may be implemented in a rectangular shape where a width (a length in an Y-axis direction) is shorter than a height (a length in a Z-axis direction), may be implemented in a rectangular shape where the width is longer than the height, or may be implemented in a square shape. A method of supporting the display device 100 or a shape of the display device 100 is not limited.

In one or more embodiments described below, a direction (+X direction) in which an image is output is defined as a forward direction, and an opposite direction (−X direction) is defined as a rear direction. In addition, an XYZ axis coordinate system is based on the display device 100, and even in a case where the display device 100 is not upright as shown in FIG. 1 and is laid down, the coordinate system based on the display device 100 is not changed.

FIG. 2 is a control block diagram of a display device according to one or more embodiments.

Referring to FIG. 2, the display device 100 according to one or more embodiments may include an LED 114, a driver Integrated Circuit (IC) 111 driving the LED 114, a power supply 112 supplying a drive voltage to the LED 114, a switching element 113 adjusting an LED to which current is supplied, and a controller 160 controlling the switching element 113.

The display device 100 according to one or more embodiments may include a plurality of LEDs 114 as a light source for displaying an image. The plurality of LEDs 114 may be arranged in one-dimensional or two-dimensional matrix.

The driver IC 111 may supply current to the LED 114 to represent a luminance corresponding to image data.

The plurality of LEDs 114 may be divided into a plurality of LED blocks, and each of the LED blocks may include a plurality of LEDs 114 connected to each other in series. In addition, the switching element 113 may be connected in parallel to each of the LED blocks.

Hereinafter, an example where N LED blocks (N is an integer equal to or greater than 2) are connected in series is described.

In the display device 100 according to one or more embodiments, a single driver IC 111 may control the N LED blocks. To this end, the driver IC 111 may be connected in series to a single LED block of the plurality of LED blocks to supply current to the LED block. For example, the driver IC 111 may be connected to one of two LED blocks disposed at both ends, of the plurality of LED blocks connected in series.

The power supply 112 may be connected in series to another LED block of the plurality of LEDs 114 to supply a drive voltage (VDD) required to drive the LED 114. For example, the power supply 112 may be connected to the other one of the two LED blocks disposed at both ends. Hereinafter, a drive voltage required to drive a single LED block is referred to as Vb.

The switching element 113 may be connected in parallel to each of the plurality of LED blocks, and an LED block that emits light may vary depending on whether the switching element 113 is turned on or off.

The controller 160 may control the switching element 113 to adjust an LED block to which current is supplied of the plurality of LED blocks.

By adjusting the LED block to which the current is supplied of the plurality of LED blocks over a time for implementing a unit frame, the controller 160 may implement a high resolution without increasing the number of driver ICs, which is described in detail later.

The LED 114 may be used as a light source of a backlight unit, or may be inserted into a self-luminous display panel and used as a respective pixel. Hereinafter, for detailed description, an example where the LED 114 is used as a light source of the backlight unit 110 is described.

To help understand a case where the LED 114 is used as a light source of the backlight unit 110, a display device including the backlight unit 110 is described first.

Figure 3:
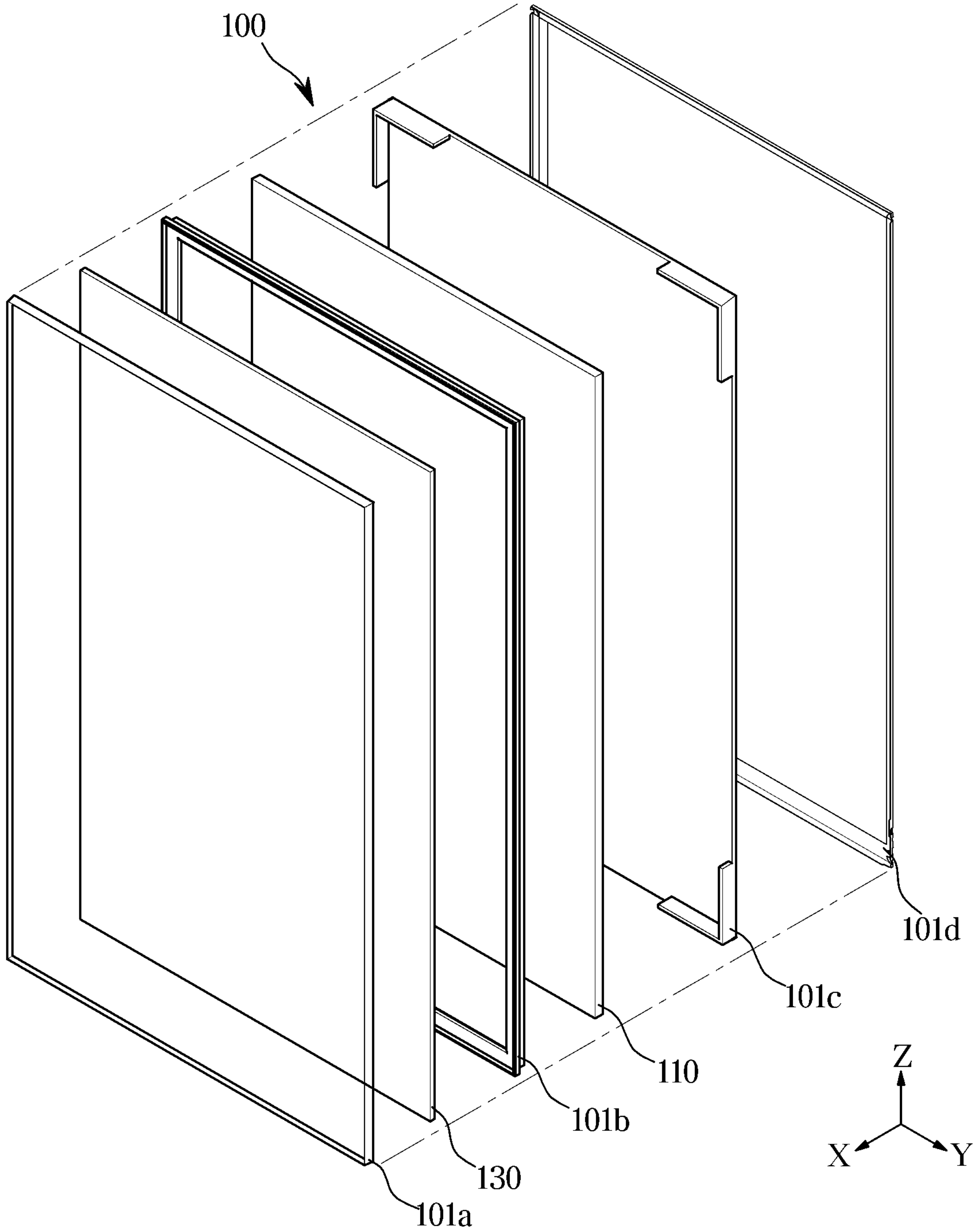
FIG. 3 illustrates an exploded perspective view of a partial configuration of a display device according to one or more embodiments.
Figure 4:
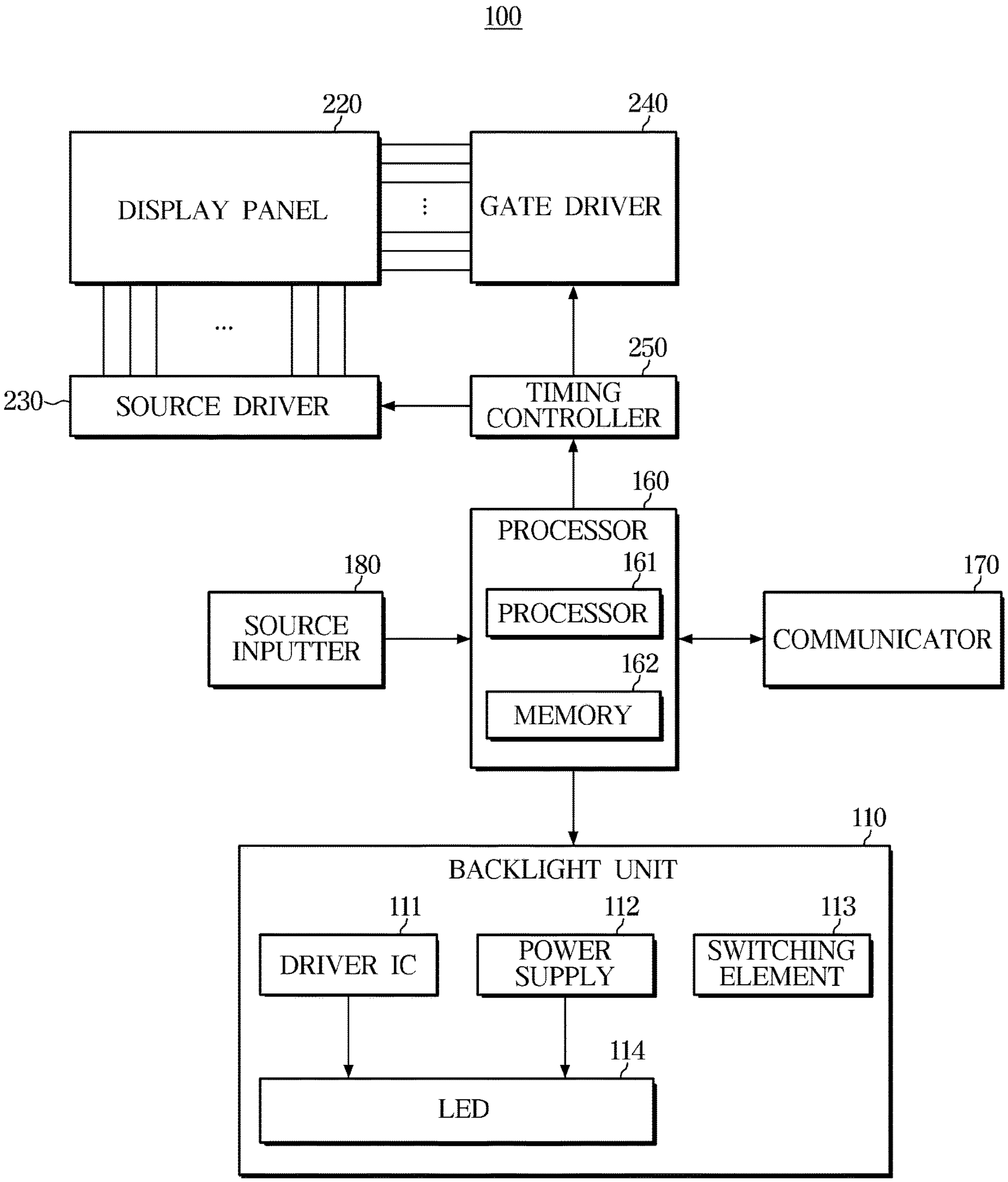
FIG. 4 is a control block diagram illustrating a display device according to one or more embodiments.

FIG. 3 is an exploded perspective view of a partial configuration of a display device according to one or more embodiments. FIG. 4 is a control block diagram of a display device according to one or more embodiments.

Referring to FIG. 3, inside the body 103, the backlight unit 110 emitting surface light forward, and a liquid crystal panel 130 blocking or transmitting the light emitted from the backlight unit 110 according to an image signal to be output may be provided.

In addition, the body 103 is provided with the liquid crystal panel 130, a bezel 101*a* for supporting and fixing the backlight unit 110, a frame middle mold 101*b*, a bottom chassis 101*c*, and a back cover 101*d*.

The backlight unit 110 is installed behind the liquid crystal panel and supplies light required for the liquid crystal panel to display an image. The backlight unit may be divided into an edge-type backlight unit in which a light source is disposed on a side of the liquid crystal panel, and a direct-type backlight unit in which a light source is disposed two-dimensionally on a lower portion of the liquid crystal panel.

The backlight unit 110 may include a plurality of point light sources that emit monochromatic light such as blue light, or white light, and may refract, reflect, and scatter light to convert the light emitted from the point light sources into uniform surface light.

The liquid crystal panel 130 is provided in front of the backlight unit 110 and may form an image by blocking or transmitting the light emitted from the backlight unit 110.

The liquid crystal panel 130 may include a plurality of pixels arranged in a two-dimensional matrix form. The plurality of pixels included in the liquid crystal panel 130 may independently block or transmit the light emitted from the backlight unit 110, and an image may be displayed on the screen 105 by the light emitted from the plurality of pixels.

As such, the backlight unit 111 requires to control and drive the LED 114, inserted as a light source of the backlight unit 111 to supply light required for the liquid crystal panel to display an image. Hereinafter, a process of controlling the LED 114 is described.

Referring to FIG. 4, the controller 160 may control the driver IC 111 and the power supply 112, included in the backlight unit 110, to supply current and drive voltage to the LED 114. In addition, by controlling on/off of the switching element 113, the controller 160 may adjust the LED 114 to which the current and the drive voltage are supplied.

A timing controller 250 may convert an image signal transmitted from the main controller into an image signal in a form that may be processed by a panel driver, and generate a control signal used to display the image signal on the display device.

The panel driver drives a panel of the liquid crystal display, and may include a gate driver 240 providing a gate signal to a gate line and a source driver 230 providing a data signal to a data line. For example, the gate driver 240 and the source driver 230 may be implemented as a Display Driver Integrated circuit (DDI).

The source driver 230 may convert image data into an analog voltage and supply to the gate line, and the gate driver 240 may supply an analog voltage pulse waveform to the gate line according to a control signal.

The controller 160 may control the source driver 230 and the gate driver 240 to supply the image data to the gate line.

In addition, the display device may further include a communicator 170 for performing wireless communication with an external electronic device. The communicator 170 may include at least one communication module transmitting and receiving data according to a predetermined communication protocol. For example, the communicator 170 may include at least one of a variety of wireless communication modules that may be connected to the Internet through wireless communication methods such as, Wi-Fi, Wireless Broadband (Wibro), Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), $4^{th}$ generation (4G) mobile communications, $5^{th}$ generation (5G) mobile communications, and the like.

The communicator 170 may perform operations such as communicating with a central server that controls the display device 100, receiving information required by a user from an external server, or transmitting information input by the user to an external server.

A source inputter 180 may receive a source signal input from a set-top box, Universal Serial Bus (USB), antenna, and the like. Accordingly, the source inputter 180 may include at least one selected from a group of source input interfaces including a High Definition Multimedia Interface (HDMI) cable port, USB port, antenna, and the like.

The process of controlling the driver IC 111, the power supply 112, and the switching element 113 to adjust the driving of the LED 114 by the controller 160 has been described above. Hereinafter, a connection relationship of each element and a driving method of the LED 114 are described with reference to a drawing of a circuit in which each element is arranged.

Figure 5:
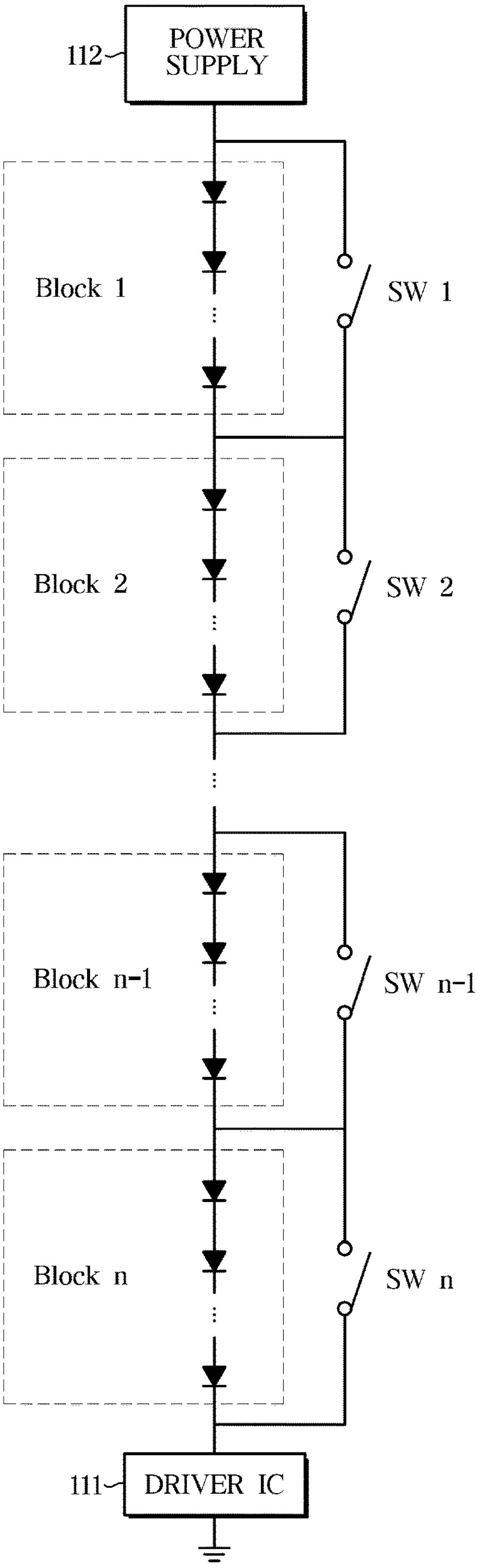
FIG. 5 illustrates a structure including a plurality of Light Emitting Diode (LED) blocks according to one or more embodiments.

FIG. 5 is a diagram illustrating a structure including a plurality of LED blocks according to one or more embodiments.

Referring to FIG. 5, a single LED block may include a plurality of LEDs 114 connected in series to each other.

Each of the LED blocks may be connected in series to each other, and the driver IC 111 connected in series to a single LED block of the plurality of LED blocks may supply current I to the plurality of LED blocks.

In addition, each of the plurality of switching elements 113 may be connected in parallel to each of the plurality of LED blocks.

The controller 160 may control on/off of the plurality of switching elements 113 to adjust an LED block to which the current I is supplied of the plurality of LED blocks, over time for implementing a unit frame.

In response to the switching element 113 being turned off, the current I flows to an LED block connected in parallel to the corresponding switching element 113, and in response to the switching element 113 being turned on, the current I flows to the switching element 113, not the LED block connected in parallel to the corresponding switching element 113.

For example, in FIG. 5, in response to a first switching element SW1 being turned off and the other switching elements being turned on, the current I flows only to a first LED block Block 1.

The controller 160 may divide the time for implementing the unit frame into a plurality of time periods, may control on/off of the plurality of switching elements to supply current to a portion of the plurality of LED blocks in a portion of the plurality of time periods, and may control on/off of the plurality of switching elements to supply current to all of the plurality of LED blocks in another portion of the plurality of time periods.

Accordingly, LED blocks driven for each time period may vary.

The power supply 112 is a device that may supply a drive voltage Vb to the plurality of LED blocks Block, and may be connected in series to another LED block of the plurality of LED blocks Block.

The controller 160 may control the power supply to adjust the drive voltage supplied to the plurality of LED blocks over a time for implementing the unit frame.

That is, the controller 160 may control the plurality of LED blocks to which the current is supplied according to on/off of the switching element 113, and in response to an increase or decrease in the number of LED blocks to which the current is supplied, the controller 160 may control the power supply 112 to increase or decrease the drive voltage supplied to the LED block.

The controller 160 may control the power supply to increase the drive voltage in response to an increase in the number of LED blocks to which the current is supplied, and may control the power supply to decrease the drive voltage in response to a decrease in the number of LED blocks to which the current is supplied.

That is, based on a drive voltage required to drive a single LED block being Vb, in response to the number of LED blocks through which current flows according to on/off of the switching element 113 being n, the power supply 112 may supply a voltage equivalent to n*Vb. In response to the number of LED blocks through which current flows being increased to m (m>n) by controlling the switching element 113, the power supply 112 may supply the increased voltage equivalent to m*Vb.

Hereinafter, for convenience of description, an example where two LED blocks and two switching elements 113, connected in parallel to the LED blocks, respectively, exist is described in detail.

Figure 6:
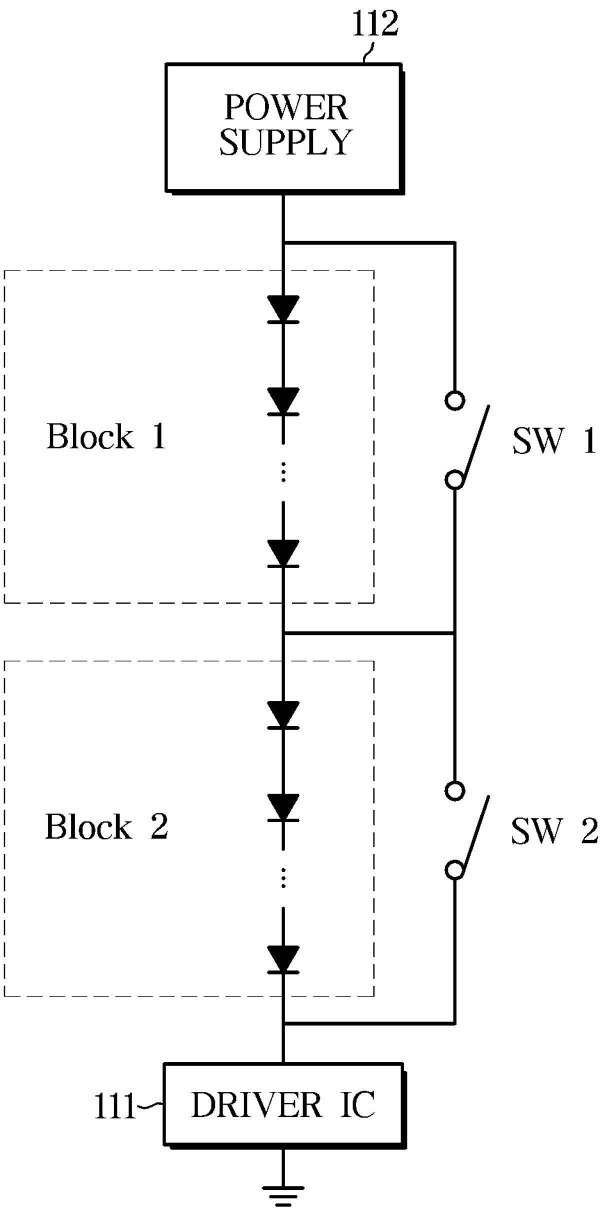
FIG. 6 illustrates a structure including two LED blocks according to one or more embodiments.
Figure 7:
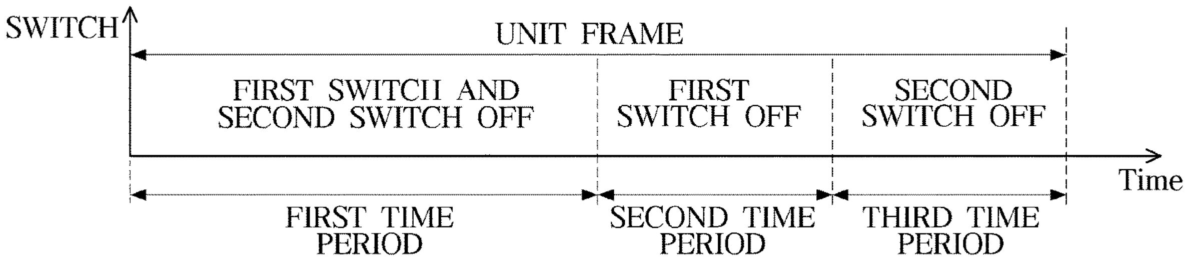
FIG. 7 illustrates controlling on/off of a switch by dividing a unit frame into a plurality of time periods according to one or more embodiments.

FIG. 6 is a diagram illustrating a structure including two LED blocks according to one or more embodiments. FIG. 7 is a diagram illustrating controlling on/off of a switch by dividing a unit frame into a plurality of time periods according to one or more embodiments.

Referring to FIG. 6, a first LED block Block 1 and a second LED block Block 2 are connected to each other in series, and a first switching element SW 1 and a second switching element SW 2 are connected in parallel to the first LED block Block 1 and the second LED block Block 2, respectively.

The driver IC 111 is connected in series to the second LED block Block 2, and the power supply 15 is connected in series to the first LED block Block 1.

To implement a high resolution by adjusting a luminance of each of the two LED blocks driven by the single driver IC 111, the controller 160 may divide a time for implementing a unit frame into a plurality of time periods and control to perform a different operation for each time period.

Referring to FIG. 7, the controller 160 may divide the time for implementing the unit frame into a first time period, a second time period, and a third time period.

The first time period may indicate a time period corresponding to a first half of the time for implementing the unit frame, the second time period may indicate a time period corresponding to a first half of a remaining half of the time for implementing the unit frame, and the third time period may indicate a time period corresponding to a last quarter of the time for implementing the unit frame.

The division of time periods described above is an example, and the time periods may be divided in different manners.

The controller 160 may control both the first switching element SW1 and the second switching element SW2 to be turned off for the first time period. In this case, current I may be supplied to both the first LED block ("Block1") and the second LED block ("Block2").

The controller 160 may control the first switching element SW1 to be turned off and control the second switching element SW2 to be turned on for the second time period. In this case, the current I may flow only to the first LED block Block1, not to the second LED block Block2.

The controller 160 may control the first switching element SW1 to be turned on and control the second switching element SW2 to be turned off for the third time period. In this case, the current I may flow only to the second LED block Block2, not to the first LED block Block1.

Hereinafter, a process by which current I flows through an LED block is described in detail through a circuit diagram.

Figure 8:
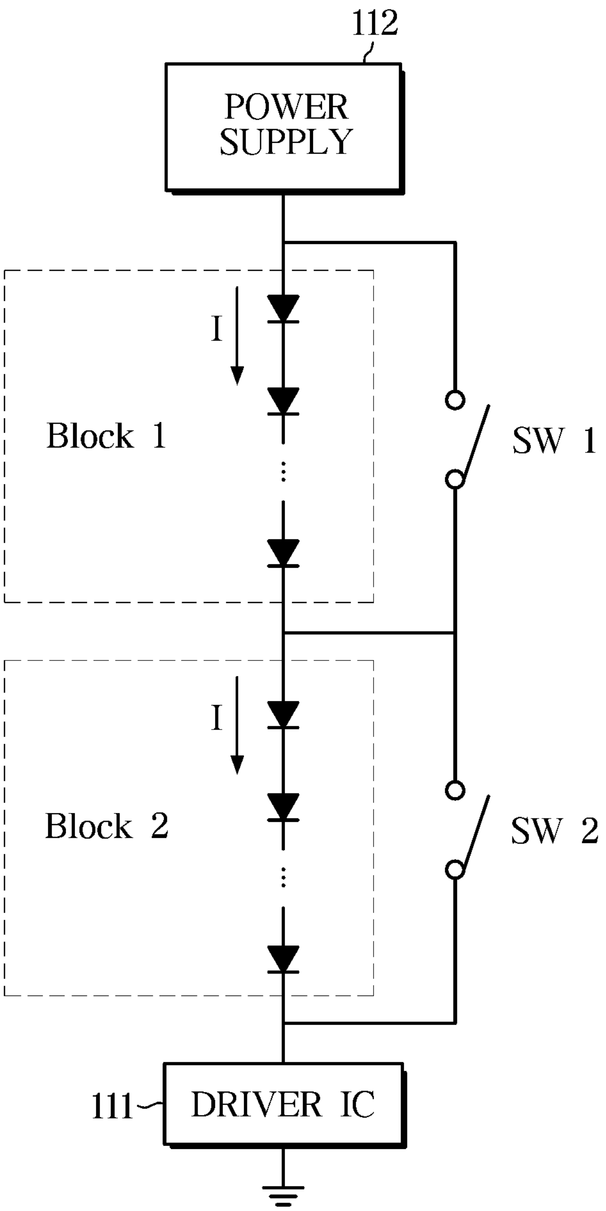
FIG. 8 illustrates an example where two switching elements are turned off according to one or more embodiments.
Figure 9:
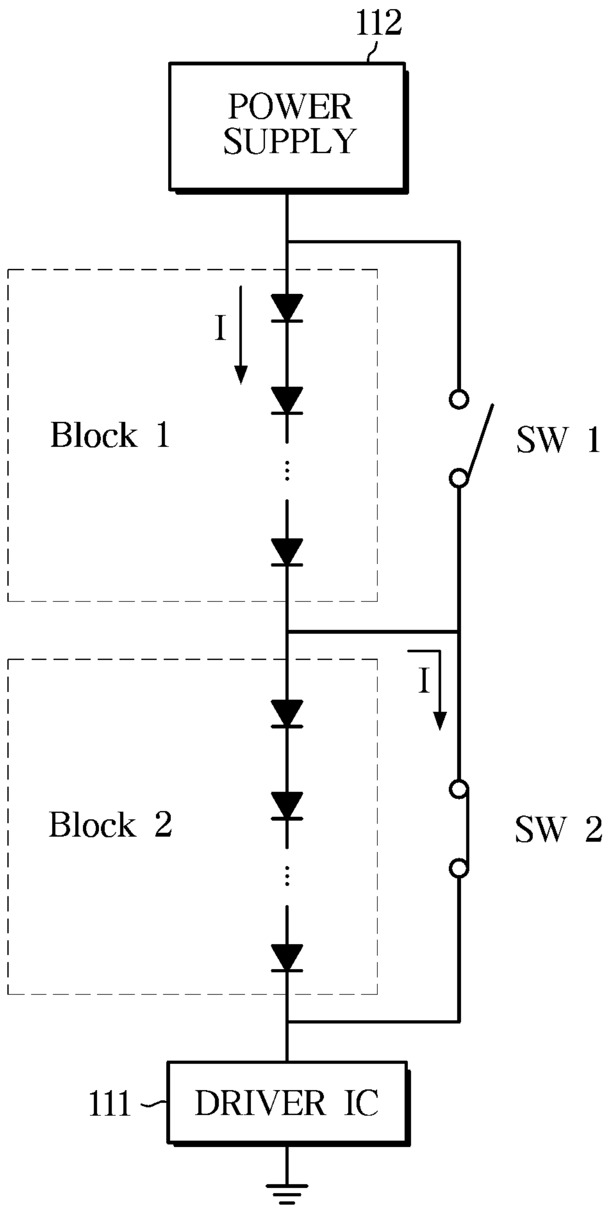
FIG. 9 illustrates an example where a first switching element is turned off and a second switching element is turned on according to one or more embodiments.
Figure 10:
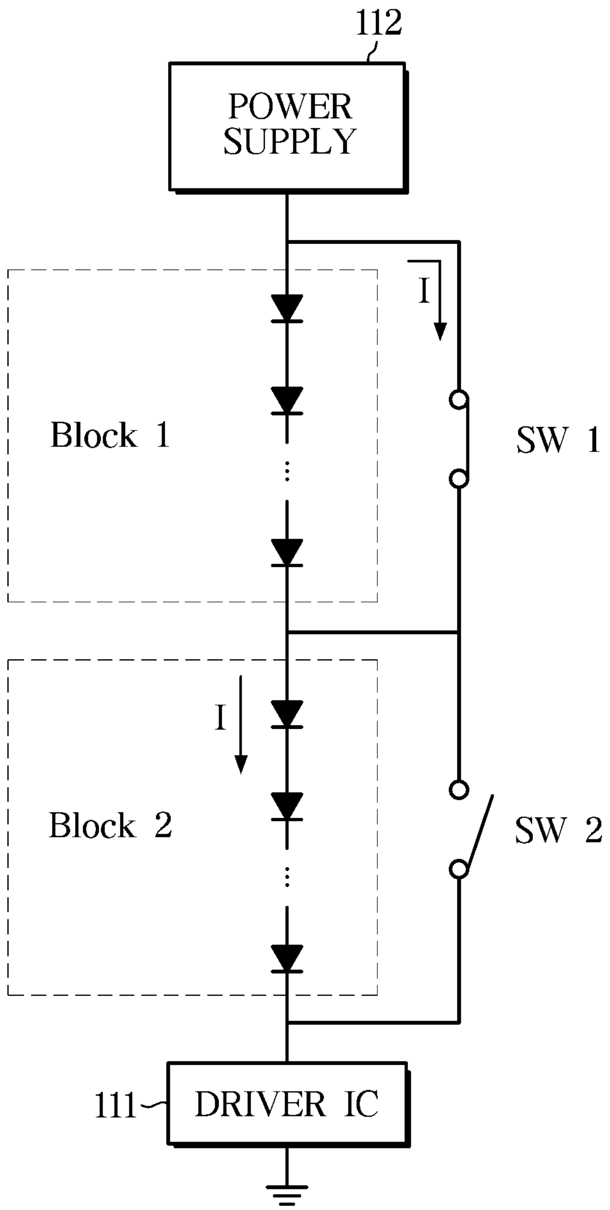
FIG. 10 illustrates an example where a first switching element is turned on and a second switching element is turned off according to one or more embodiments.

FIG. 8 is a diagram illustrating an example where two switching elements are turned off according to one or more embodiments. FIG. 9 is a diagram illustrating an example where a first switching element is turned off and a second switching element is turned on according to one or more embodiments. FIG. 10 is a diagram illustrating an example where a first switching element is turned on and a second switching element is turned off according to one or more embodiments.

Referring to FIG. 8, a circuit diagram where the controller 160 controls both a first switching element SW1 and a second switching element SW2 to be turned off in the first time period is illustrated.

Because both the first switching element SW1 and the second switching element SW2 are turned off and a conductive line is not connected, current I supplied from the driver IC 111 may be supplied to both a first LED block Block1 and a second LED block Block2.

The current I is supplied to both the first LED block Block1 and the second LED block Block2, and thus a plurality of LEDs included in each of the LED blocks emit light. Accordingly, all of the first LED block Block1 and the second LED block Block2 emit light.

Referring to FIG. 9, a circuit diagram where the controller 160 controls a first switching element SW1 to be turned off and controls a second switching element SW2 to be turned on in the second time period is illustrated.

Because the first switching element SW1 is turned off and a conductive line is not connected, current I supplied from the driver IC 111 may be supplied to a first LED block Block1. However, because the second switching element SW2 is turned on and a conductive line is connected, the current I supplied from the driver IC 111 may not be supplied to a second LED block Block2 and may flow only to the second switching element SW2.

The current I is supplied to the first LED block Block1 and a plurality of LEDs included in the first LED block emit light, and thus the first LED block Block1 emits light. However, the second LED block Block2 does not emit light because the second LED block Block2 is not supplied with the current I.

Referring to FIG. 10, a circuit diagram where the controller 160 controls a first switching element SW1 to be turned on and controls a second switching element SW2 to be turned off in the third time period is illustrated.

Because the second switching element SW2 is turned off and a conductive line is not connected, current I supplied from the driver IC 111 may be supplied to a second LED block Block1. However, because the first switching element SW1 is turned on and the conductive line is connected, the current I supplied from the driver IC 111 may not be supplied to a first LED block Block1 and may flow only to the first switching element SW1.

The current I is supplied to the second LED block Block2 and a plurality of LEDs included in the second LED block emit light, and thus the second LED block Block1 emits light. The first LED block Block2 which is not supplied with the current I does not emit light.

Figure 11:
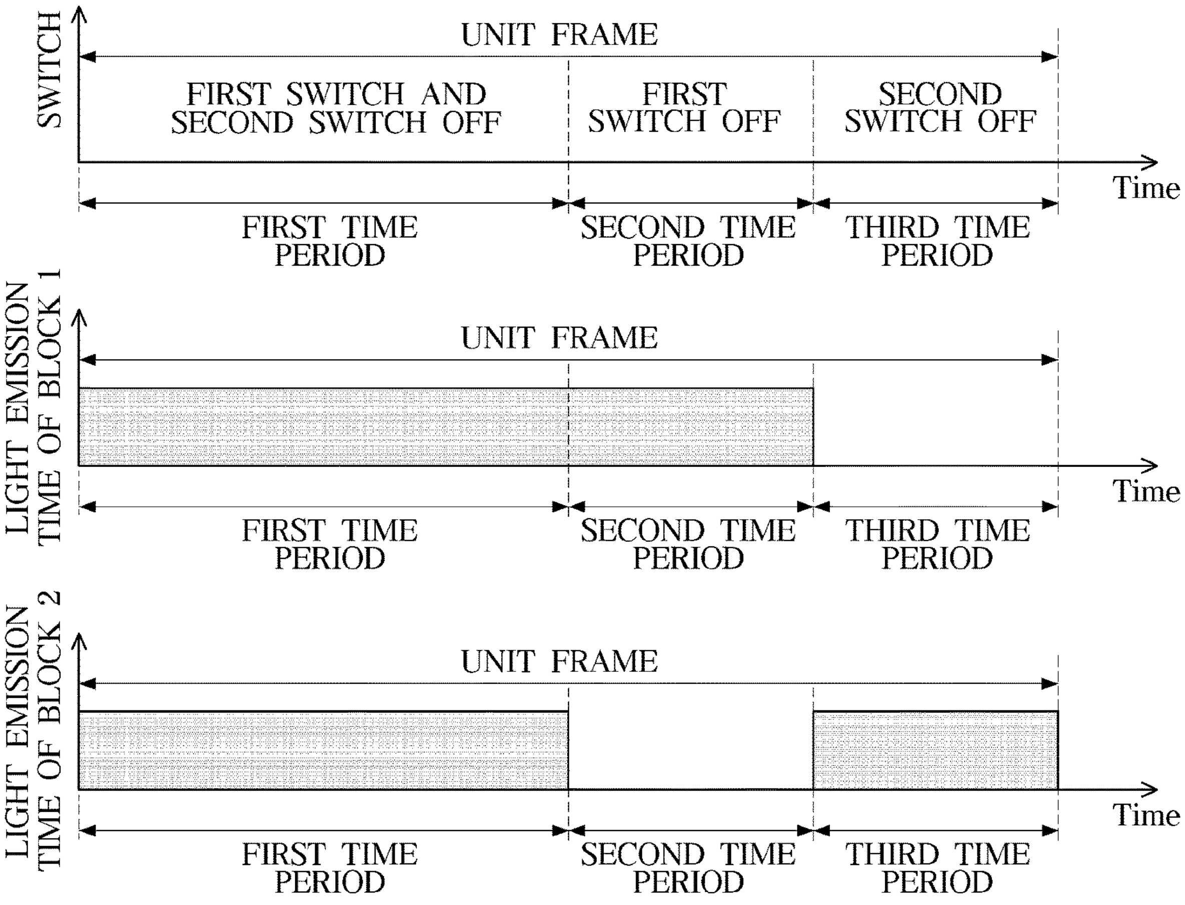
FIG. 11 illustrates a time at which an LED block emits light according to on/off of a switching element for each time period according to one or more embodiments.

FIG. 11 is a diagram illustrating a time at which an LED block emits light according to on/off of a switching element for each time period according to one or more embodiments.

As described above, in the first time period, both the first switching element SW1 and the second switching element SW2 are controlled to be turned off, and thus both the first LED block Block1 and the second LED block Block2 may be supplied with current and emit light.

In addition, in the second time period, the first switching element SW1 is controlled to be turned off and the second switching element SW2 is controlled to be turned on, and thus only the first LED block Block1 may be supplied with current and emit light.

In the second time period, the first switching element SW1 is controlled to be turned on and the second switching element SW2 is controlled to be turned off, and thus only the second LED block Block2 may be supplied with current and emit light.

As described above, the controller 160 may divide a time for implementing a unit frame into a plurality of time periods, control on/off of the switching element 113 for each time period, and adjust an LED block that is supplied with current and emits light.

Because LED blocks driven for each time period are different, the controller 160 may control the power supply 112 to vary a drive voltage supplied by the power supply 112 according to the number of driving LED blocks to reduce power consumption and heat generation.

Figure 12:
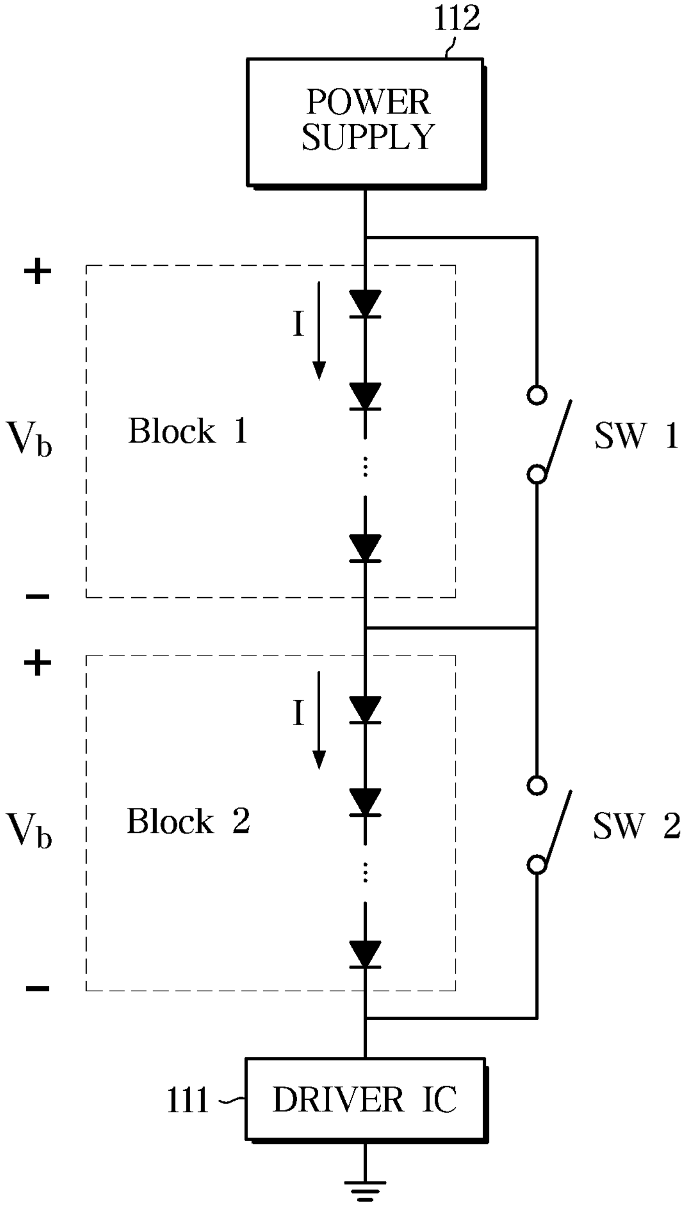
FIG. 12 illustrates supplying a drive voltage by a power supply in response to two LED blocks emitting light according to one or more embodiments.
Figure 13:
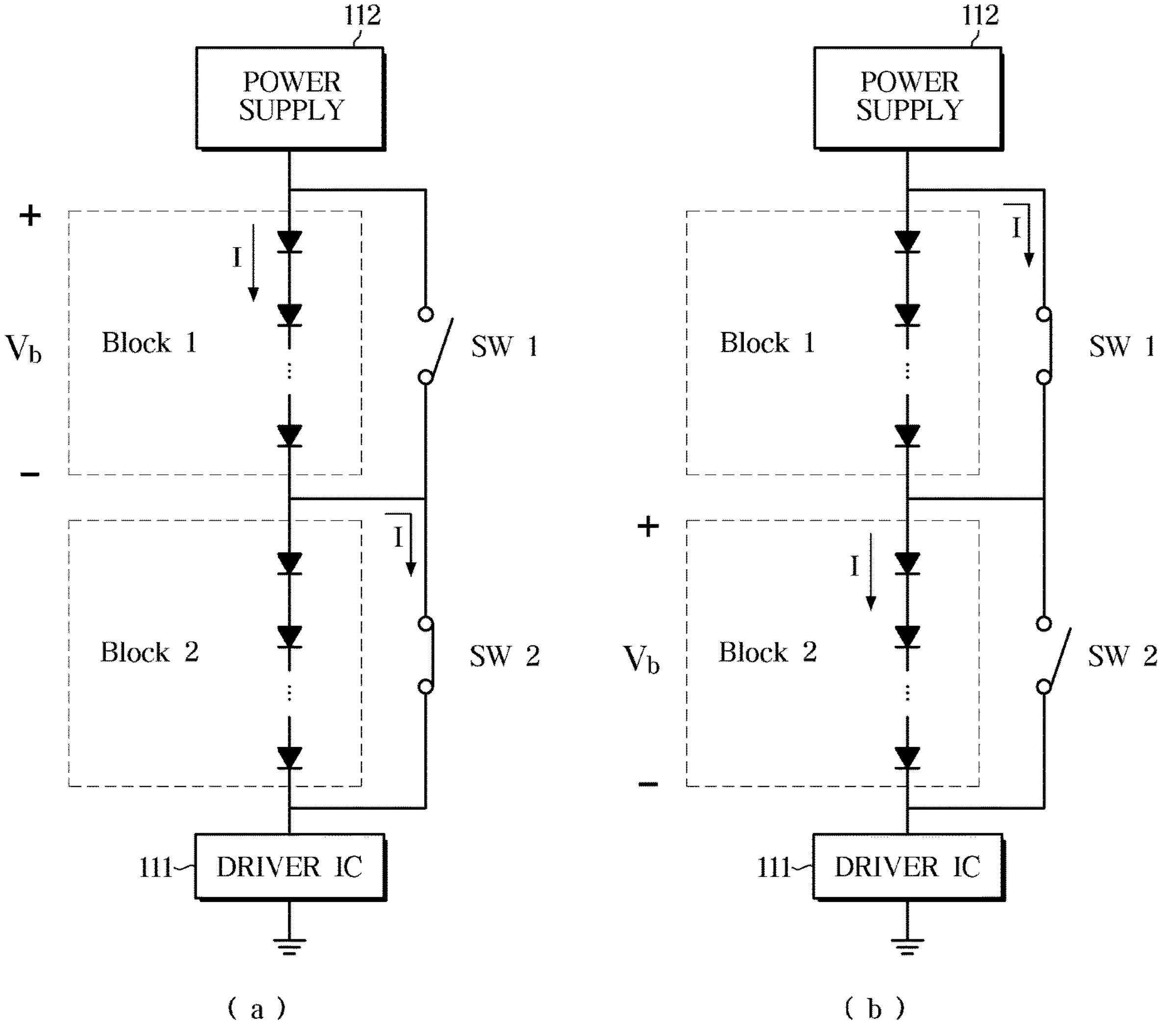
FIG. 13 illustrates supplying a drive voltage by a power supply in response to only one of two LED blocks emitting light according to one or more embodiments.

FIG. 12 is a diagram illustrating supplying a drive voltage by a power supply in response to two LED blocks emitting light according to one or more embodiments. FIG. 13 is a diagram illustrating supplying a drive voltage by a power supply in response to only one of two LED blocks emitting light according to one or more embodiments.

Referring to FIG. 12, a circuit diagram where the controller 160 controls both a first switching element SW1 and a second switching element SW2 to be turned off in the first time period is illustrated.

In this case, as described above, current is supplied to both a first LED block Block1 and a second LED block Block2 to emit light, and thus the power supply may supply a drive voltage corresponding to the number of LED blocks that emit light.

That is, in FIG. 12, because two LED blocks emit light, the power supply 112 may supply a voltage 2Vb that is twice a drive voltage Vb required to drive a single LED block.

Referring to FIG. 13, a circuit diagram ((a) in FIG. 13) where the controller 160 controls a first switching element SW1 to be turned off and controls a second switching element SW2 to be turned on in the second time period, and a circuit diagram ((b) of FIG. 13) where the controller 160 controls the first switching element SW1 to be turned on and controls the second switching element SW2 to be turned off in the third time period are illustrated.

In this case, as described above, only the first LED block may be supplied with current and emit light in the second time period, and only the second LED block may be supplied with current and emit light in the third time period.

That is, in each case in FIG. 13, because a single LED block emits light, the power supply 112 may supply a voltage equivalent to the drive voltage Vb required to drive a single LED block.

Figure 14:
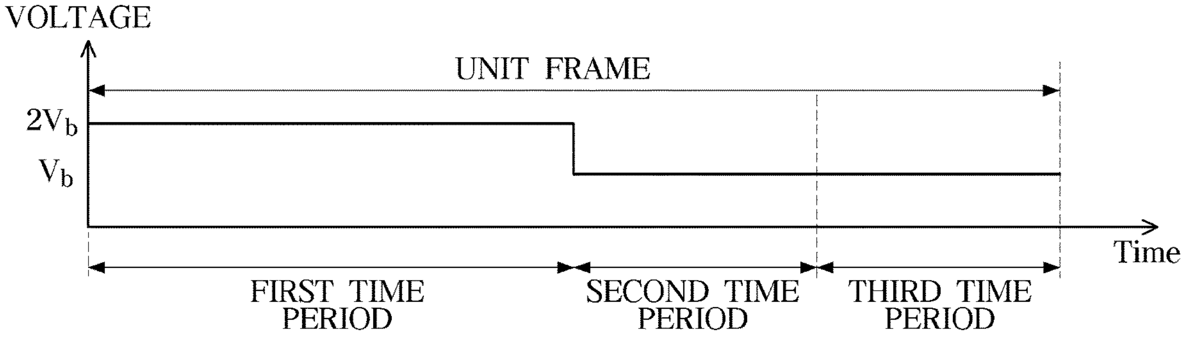
FIG. 14 illustrates a supply voltage supplied by a power supply for each time period according to one or more embodiments.

FIG. 14 is a diagram illustrating a supply voltage supplied by a power supply for each time period according to one or more embodiments.

As described above, because both LED blocks emit light in the first time period, the power supply 112 may supply a voltage twice as much as a drive voltage Vb required to drive a single LED block.

Because only one LED block emits light in the second and third time periods, the power supply 112 may supply a voltage equivalent to the drive voltage Vb required to drive a single LED block.

As such, power consumption and heat generation may be reduced by supplying only as much drive voltage as the number of LED blocks which are emitting light.

Figure 15:
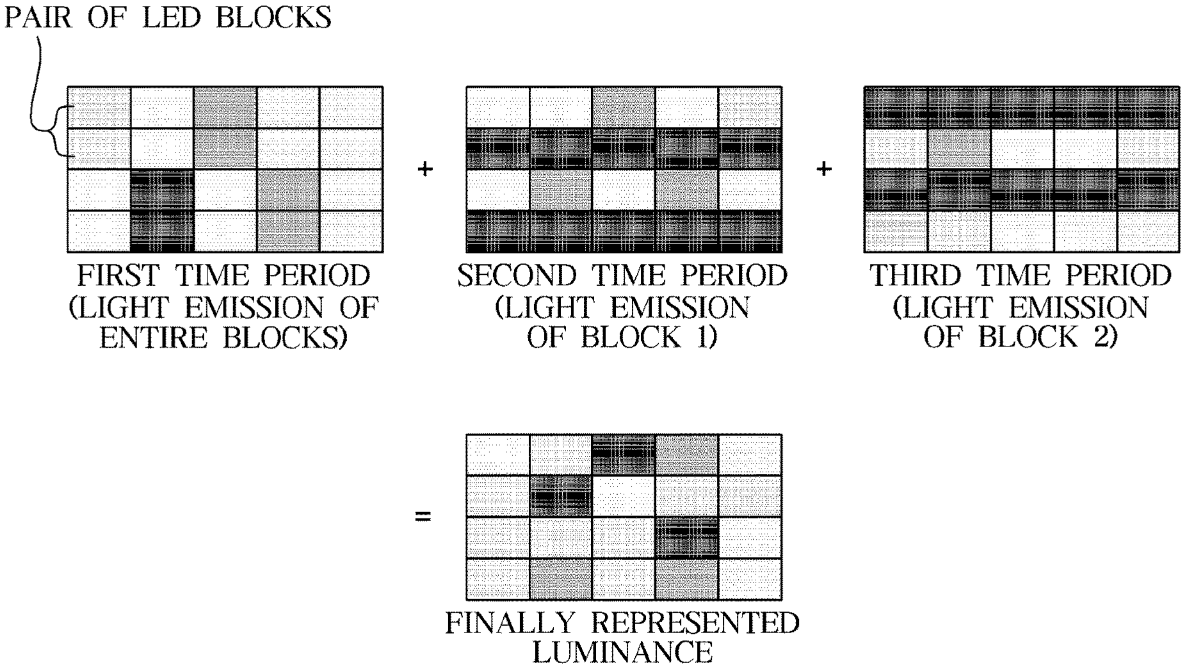
FIG. 15 illustrates a luminance representation method of a display device according to one or more embodiments.

FIG. 15 is a diagram illustrating a luminance representation method of a display device according to one or more embodiments.

Referring to FIG. 15, each block represents an LED block. FIG. 15 shows a structure in which two LED blocks located above and below form a pair and a total of 10 pairs of LED blocks are combined.

Figure 16:
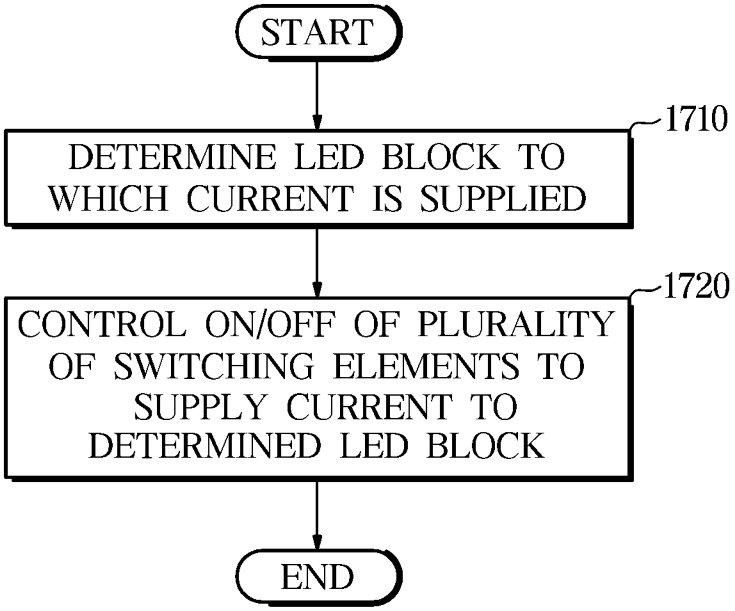
FIG. 16 illustrates a method for controlling a display device.

Because a pair of LED blocks emits light in the first time period, the two LED blocks above and below may emit light with the same luminance as shown in FIG. 16.

In this case, the controller 160 may control the power supply 112 to output current according to data to be emitted from each of the LED blocks.

That is, the controller 160 may adjust the current supplied from the driver IC 111, according to a luminance to be represented in each of the LED blocks based on the data.

In the second time period, as described above, only the first LED block emits light and the second LED block does not emit light. Accordingly, as shown in FIG. 16, only the LED blocks located above of the pairs of LED blocks may emit light, and the LED blocks located below may not emit light.

In the third time period, as described above, only the second LED block emits light and the first LED block does not emit light. Accordingly, as shown in FIG. 16, only the LED blocks located below of the pairs of LED blocks may emit light, and the LED blocks located above may not emit light.

By dividing a time for implementing a unit frame and varying a luminance for each time period, a user U looking at the display device may recognize, as a luminance finally represented by the display device 100, a luminance obtained by adding up the luminance of each of the LED blocks in each time period.

The controller 160 may use any one of Pulse Width Modulation (PWM) control or Pulse Amplitude Modulation (PAM) control to represent the luminance of the plurality of LED blocks.

FIG. 16 is a flowchart illustrating a method for controlling a display device.

Referring to FIG. 16, the display device 100 may determine an LED block to which current is supplied, through image data input through the communicator 170 or the source inputter 180. (1710)

Once the LED block to which the current is supplied is determined, the plurality of switching elements 113 are controlled to be turned on or off to supply the current to the determined LED block. (1720)

The process of supplying the current to the LED block by controlling on/off of the plurality of switching elements 113 has been described above, and the description thereof is omitted.

Figure 17:
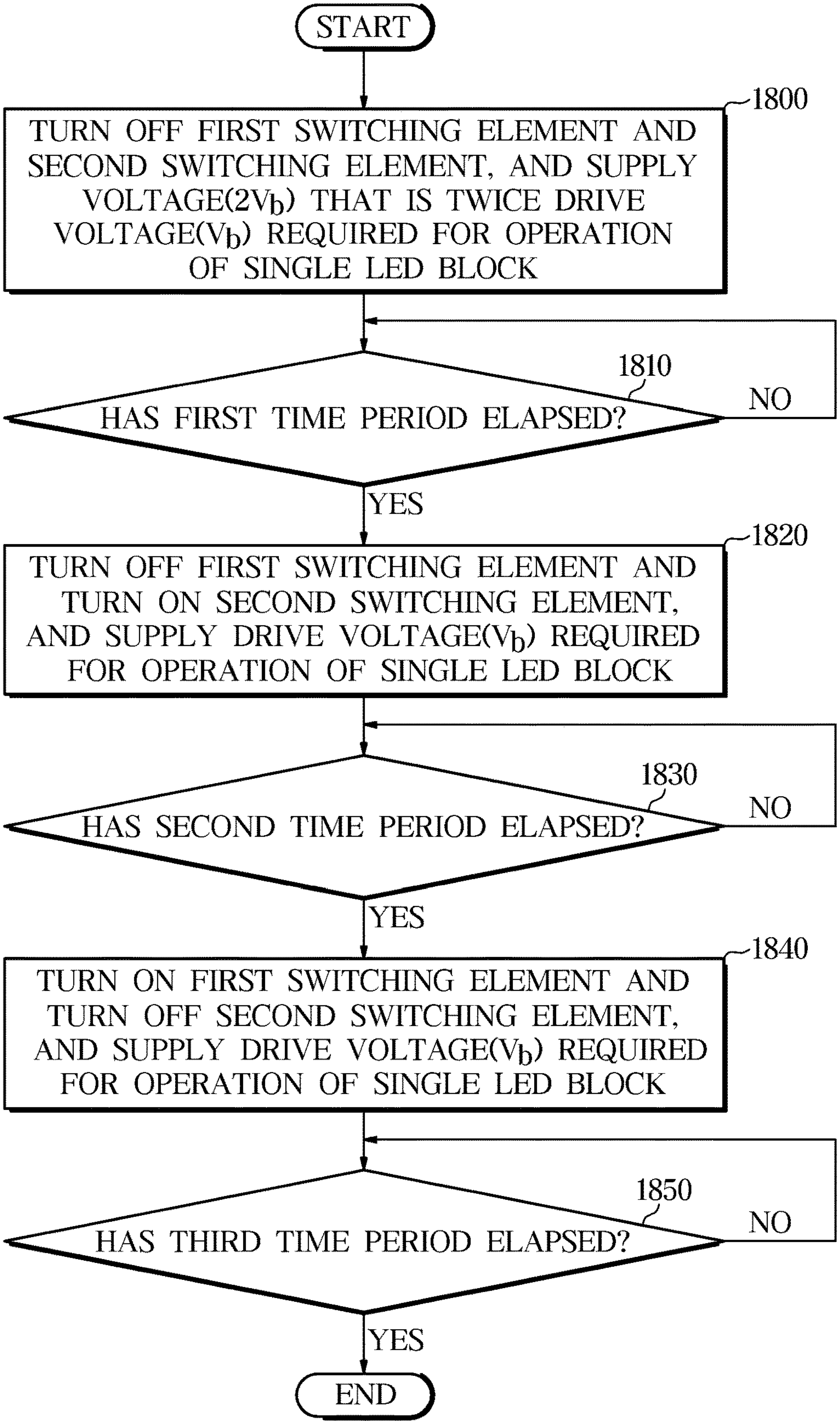
FIG. 17 illustrates a method for controlling a display device.

FIG. 17 is a flowchart illustrating a method for controlling a display device.

As described above, the controller 160 may divide a time for implementing a unit frame into a first time period, a second time period, and a third time period, and control on/off of the switching element 113 for each time period.

For the first time period, both a first switching element SW1 and a second switching element SW2 may be controlled to be turned off, and thus current may be supplied to both a first LED block Block1 and a second LED block Block2. (1800)

In this instance, because two LED blocks that are driven exist, the power supply may supply a voltage 2Vb that is twice a drive voltage Vb required for an operation of a single LED block. (1800)

In response to the first time period having not elapsed (No in 1810), the above-described process may be continuously performed, and in response to the first time period having elapsed (Yes in 1810), an operation to be described below may be performed.

For the second time period, the first switching element SW1 may be controlled to be turned off and the second switching element SW2 may be controlled to be turned on, and thus current is supplied only to the first LED block Block1, not to the second LED block Block2. (1820)

In this instance, because an LED block that is driven is the first LED block Block1 only, the power supply may supply a voltage equivalent to the drive voltage Vb required for an operation of a single LED block. (1820)

In response to the second time period having not elapsed (No in 1830), the above-described process may be continuously performed, and in response to the second time period having elapsed (Yes in 1830), an operation to be described below may be performed.

For the third time period, the first switching element SW1 may be controlled to be turned on and the second switching element SW2 may be controlled to be turned off, and thus current is supplied only to the second LED block Block2, not to the first LED block Block1. (1840)

In this instance, because an LED block that is driven is the second LED block Block2 only, the power supply may supply a voltage equivalent to the drive voltage Vb required for an operation of a single LED block. (1840)

In response to the third time period having not elapsed (No in 1850), the above-described process may be continuously performed, and in response to the third time period having elapsed (Yes in 1850), the operation is terminated.

One or more embodiments may be embodied in the form of a recording medium storing instructions executable by a computer. The instructions may be stored in the form of program code and, when executed by a processor, may generate a program module to perform the operations of one or more embodiments. The recording medium may be embodied as a computer-readable recording medium.

The computer-readable recording medium includes all kinds of recording media in which instructions which may be decoded by a computer are stored. For example, there may be a Read Only Memory (ROM), a Random Access Memory (RAM), a magnetic tape, a magnetic disk, a flash memory, and an optical data storage device.

Although one or more example embodiments are provided herein, the disclosure is not limited to these embodiments, and those skilled in the art may modify these embodiments without departing from the principles and scope of the disclosure.

What is claimed is:

1. A display device, comprising:
a plurality of Light Emitting Diode (LED) blocks configured to be connected in series;
a driver Integrated Circuit (IC) configured to:
supply a current to the plurality of LED blocks, and
be connected in series to a first LED block of the plurality of LED blocks;
a plurality of switching elements configured to be connected in parallel to the plurality of LED blocks; and
a controller configured to control on/off of the plurality of switching elements to adjust one of the plurality of LED blocks, to which the current is supplied, over a time for implementing a unit frame,
wherein the time for implementing the unit frame includes a first time period, a second time period, and a third time period, and
wherein the first time period indicates a time period corresponding to a first half of the time for implementing the unit frame, the second time period indicates a time period corresponding to a first half of a remaining half of the time for implementing the unit frame, and the third time period indicates a time period corresponding to a last quarter of the time for implementing the unit frame.

2. The display device of claim 1, wherein the controller is further configured to:
divide the time for implementing the unit frame into a plurality of time periods,
control on/off of the plurality of switching elements to supply the current to a portion of the plurality of LED blocks in a first portion of the plurality of time periods, and
control on/off of the plurality of switching elements to supply the current to all of the plurality of LED blocks in a second portion of the plurality of time periods.

3. The display device of claim 2, further comprising:
a power supply configured to be connected in series to a second LED block of the plurality of LED blocks to supply a drive voltage (VDD),
wherein the controller is further configured to control the power supply to adjust the drive voltage supplied to the plurality of LED blocks over the time for implementing the unit frame.

4. The display device of claim 3, wherein the controller is further configured to control the power supply to increase or decrease the drive voltage supplied to the LED block in response to an increase or a decrease in a number of LED blocks of the plurality of LED blocks to which the current is supplied according to on/off status of a switching element.

5. The display device of claim 4, wherein the controller is further configured to:
control the power supply to increase the drive voltage in response to the increase in the number of LED blocks to which the current is supplied, and
control the power supply to decrease the drive voltage in response to the decrease in the number of LED blocks to which the current is supplied.

6. The display device of claim 5, wherein the plurality of LED blocks comprise:
a third LED block; and a fourth LED block configured to be connected in series to the third LED block, wherein the plurality of switching elements comprise:

a first switching element configured to be connected in parallel to the third LED block; and a second switching element configured to be connected in parallel to the fourth LED block.

7. The display device of claim 6, wherein the controller is further configured to control both the first switching element and the second switching element to be turned off for the first time period.

8. The display device of claim 7, wherein the controller is further configured to control the first switching element to be turned off and control the second switching element to be turned on for the second time period, and control the first switching element to be turned on and control the second switching element to be turned off for the third time period.

9. The display device of claim 8, wherein the controller is further configured to control the power supply to supply a voltage equivalent to twice a drive voltage required for operation of a single LED block for the first time period, and supply a drive voltage required for operation of a single LED block for the second time period and the third time period.

10. The display device of claim 9, wherein the controller is further configured to control the driver IC to output the current according to data to be emitted from the LED block.

11. The display device of claim 10, wherein the controller is further configured to control the plurality of LED blocks to represent a luminance using one of a Pulse Width Modulation (PWM) control or a Pulse Amplitude Modulation (PAM) control.

12. A method for controlling a display device including a plurality of Light Emitting Diode (LED) blocks connected in series, a driver Integrated Circuit (IC) to supply a current to the plurality of LED blocks and be connected in series to a first LED block of the plurality of LED blocks, and a plurality of switching elements connected in parallel to the plurality of LED blocks, the method comprising:

determining one of the plurality of LED blocks, to which the current is supplied, over a time for implementing a unit frame; and controlling on/off of the plurality of switching elements to supply the current to the determined one of the plurality of LED blocks, wherein the time for implementing the unit frame includes a first time period, a second time period, and a third time period, and wherein the first time period indicates a time period corresponding to a first half of the time for implementing the unit frame, the second time period indicates a time period corresponding to a first half of a remaining half of the time for implementing the unit frame, and the third time period indicates a time period corresponding to a last quarter of the time for implementing the unit frame.

13. The method of claim 12, wherein the controlling of on/off of the plurality of switching elements further comprises:

dividing the time for implementing the unit frame into a plurality of time periods, controlling on/off of the plurality of switching elements to supply the current to a portion of the plurality of LED blocks in a first portion of the plurality of time periods, and controlling on/off of the plurality of switching elements to supply the current to all of the plurality of LED blocks in a second portion of the plurality of time periods.

14. The method of claim 13, further comprising:

adjusting a drive voltage supplied to the plurality of LED blocks over the time for implementing the unit frame.

15. The method of claim 14, wherein the adjusting of the drive voltage comprises increasing or decreasing the drive voltage supplied to the LED block in response to an increase or a decrease in a number of LED blocks of the plurality of LED blocks to which the current is supplied according to on/off status of a switching element.

* * * * *